Feb. 5, 1935.  G. F. DALY  1,989,848
SUBTRACTING TABULATOR
Filed Dec. 1, 1930   5 Sheets-Sheet 1

FIG. 1.

INVENTOR
Geo. F. Daly
BY
W. M. Wilson
ATTORNEY

Feb. 5, 1935.   G. F. DALY   1,989,848
SUBTRACTING TABULATOR
Filed Dec. 1, 1930   5 Sheets-Sheet 2

INVENTOR
Geo. F. Daly
BY ATTORNEY
W. M. Wilson

Feb. 5, 1935.  G. F. DALY  1,989,848
SUBTRACTING TABULATOR
Filed Dec. 1, 1930  5 Sheets-Sheet 3

FIG. 6.

| AMOUNT | INVERTER-A | INVERTER-B | COUNTER-C CREDIT BALANCE | COUNTER-D DEBIT BALANCE |
|---|---|---|---|---|
| + 9430 | 9430 | | | |
| + 671 | | 671 | 9430 | 99990569 1 |
| − 10234 | 10234 | | 671 | 99999328 1 |
| + 70629 | | 70629 | 99989765 1 | 10234 |
| − 1110 | 1110 | | 70629 | 99929370 1 |
| − 899 | | 899 | 99998889 1 | 1110 |
| | | | 99999100 1 | 899 |
| | | | 68487 | 99931513 |

FIG. 5.

INVENTOR
Geo. F. Daly
BY ATTORNEY W. M. Wilson

Patented Feb. 5, 1935

1,989,848

UNITED STATES PATENT OFFICE 1,989,848

SUBTRACTING TABULATOR

George F. Daly, Johnson City, N. Y., assignor, by mesne assignments, to International Business Machines Corporation, New York, N. Y., a corporation of New York Application December 1, 1930, Serial No. 499,279

20 Claims. (Cl. 235—92)

This invention concerns accounting machines and has for its principal object the provision of an improved and simplified form of subtracting mechanism.

The accounting apparatus disclosed is adapted to receive different classes of entries such as debits or credits and finally give a true net balance whether negative or positive, i. e. debit or credit.

In this application various kinds of amounts are mentioned, for instance, positive amounts, negative amounts, complements of positive amounts, complements of negative amounts, full complements, etc. In this specification I shall designate as a "true" amount or figure any number, whether positive or negative, which directly indicates the value of that amount above or below zero. When a complement of an amount is mentioned it will usually refer to a number which is the nines complement of the amount. By a full or true complement is meant the number which when added to an amount will give all zeros, or in other words, a nines complement to which the elusive one has been added. By inverting a number is meant the changing of a true number to the complement of the number.

In the machine disclosed a true amount is read off a perforated card, then by means of certain novel devices said true amount and the complement of said true amount are secured and selectively added separately on debit and credit balance counters or accumulators.

The storing of a number in the wheels of one of two auxiliary entry receiving devices on alternate card cycles so that both the true number and the complement may subsequently be added on credit and debit balance accumulators during a single card cycle is a feature of the present invention.

Complementary punching of the record is a well known expedient to enable negative amounts to be handled in the present type of machine. In the ordinary use of the present machine such complementary punched cards are unnecessary. By means of the novel devices present in this invention it is possible to secure the results previously obtained with complementary punched cards without the necessity of such special punching.

An object of the invention is to provide a novel mechanism for taking an inverted reading of one data representing device and controlling another data representing device in accordance with the reading.

Another object is to provide a novel electrically controlled subtracting mechanism for accounting machines in which the electrical controlling circuits are simplified over those previously in use.

An object of the invention is to provide an electrically operated subtracting mechanism for a multidenominational accumulator in which a common wire or bus bar serves to supply the operating current for similar operations on all denominational orders in the same condition.

Another object is to provide a subtracting mechanism for a multidenominational accumulator by the use of complementary amounts that are derived from amounts read from other settable entry receiving devices in the form of timed impulses that are initiated by an emitting device at a time to give an inverted or complementary reading.

Another object is to provide a subtracting device according to the last preceding object in which each denominational order accumulating element is provided with mechanism to select only such emitted impulses as correspond with the complement of its reading.

Another object is to provide a subtracting mechanism in accordance with the last two preceding objects in which each denominational order impulse selecting mechanism consists of a commutator and brush device settable according to the number entered into the related denominational order storage wheel of an entry receiving device.

A feature of the invention is the arrangement enabling the simultaneous resetting of a storage wheel and reading of the complement of the figure standing on the wheel.

The invention discloses the use of two entry receiving devices for alternate reception and inversion of numbers that are added on one or the other of two accumulators from which the true credit or debit balance may be read or printed.

There is disclosed a novel use of a storage wheel in conjunction with electric circuits for inverting the number standing on the wheel and thereby obtaining complemental numbers for use in subtraction.

The invention is shown as applied to an electrical tabulator of the type shown in the patent to G. F. Daly and R. E. Page No. 1,762,145, June 10, 1930.

According to the present invention two separate entry receiving devices in the machine are used merely as means for alternately storing and inverting readings of numbers read off punched cards passing through the tabulator. The amount alternately entered into one or the other of these devices is always a true amount read directly from a card under the upper brushes. The number read from a device is always the complement of the number read into it. Thus, each entry receiving device forms part of what may be called an inverter device.

One or the other of a pair of counters or accumulators has accumulated thereon the complement taken from an inverter device. The one of these counters which does not receive the complement receives the true amount from a reading of the card when it is under the lower brushes. These accumulators may be called balance counters, all true positive amounts going into the credit balance counter and all true negative amounts going into the debit balance counter. In this pair of balance counters the complemental figures from the inverter devices are received so that the complements of all true positive amounts are entered into the counter which is accumulating the true negative amounts, and the complements of all true negative amounts are entered into the counter which is accumulating the true positive amounts. Briefly, one of the balance counters accumulates all true positive items plus the complements of all true negative items, and the other balance counter accumulates all true negative items plus the complements of all true positive items. This means that if the total of the true positive amounts exceeds the total of the true negative amounts, a true number will appear in the first balance counter and the complement will appear in the second balance counter.

Conversely, if the total of the true negative amounts entered in the counters exceeds the sum of the true positive amounts which are entered in them, the second balance counter will show a true negative amount and its complement will appear in the first balance counter.

While one inverter entry receiving device is receiving the results of reading a card under the upper brushes, the complement of the number standing on the other previously operated inverter device is being transferred to the credit or debit balance counter. The inverter device from which the complement is being transferred is reset simultaneously with the transferal thus conditioning it for the reception of a number on the next card cycle. A complement may be read off one or the other of the inverter devices during each card cycle.

The devices for selecting which balance counter is to receive the complement and which balance counter the true number, are controlled by a special hole in a debit card. When a card without the special hole, i. e., a credit card, passes through the machine, the true number is added on the credit balance counter while the nines complement of the number is added on the debit balance counter. When a debit card passes through the machine the true negative amount is added on the debit balance counter and the complement is added on the credit balance counter. It is obvious that the special hole could be placed on a credit card or that other forms of control could be applied to the counter selection devices.

The elusive or fugitive one is always added to the counter on which the complemental number is added in order to fill out the complement which, before the addition of the elusive one, is made up of the nines complements of all digits. The actuation of a units under transfer arm for obtaining the elusive one in the counter receiving the complement, is controlled selectively by the same means which determines the balance counter selection.

From the above it may be gathered that the inverter entry receiving devices are controlled in an invariable cyclic manner to receive numbers and be reset; while on the other hand the balance counters are controlled selectively to receive a true number or a full complement of that number according to whether the amount is a debit or a credit item.

At any point in the operation of the machine a reading of the wheels on one of the inverter devices will reveal the number which is about to be entered into one of the balance counters. A reading of the balance counters will disclose the true credit or debit balance on one counter and the complement of the balance on the other counter. A printed record of both the true balance and the complement may be obtained.

In order to obtain a complemental or inverted transferal of the number standing on an inverter device each storage wheel of the inverter may be provided with a commutator having a segment corresponding to each significant figure indication of the storage wheel. A brush may be geared to the wheel so that it always rests on the commutator segment corresponding to the digit reading of the wheel. Each of these brushes may be selectively connected to one or the other of related counter magnets in the balance counters to throw in the counter wheel operating clutch at the proper time during the rotation of the counter shaft. An impulse emitting device is provided coordinated with nine separate lines which are allotted to the nine significant digits and the emitter is arranged to supply impulses to these lines at a point in the machine operation corresponding to the complement of the digit value which they represent.

Thus the "8" line receives an impulse timed to energize the connected balance counter magnets so that the counter wheels receive one step of movement, the "7" line receives an impulse timed to enable the clutches to turn the balance counter wheels through two spaces, and so on. All the commutator segments corresponding to the "8" position of the inverter storage wheels are connected to the "8" impulse line from the emitter, all the "7" segments are likewise connected with the "7" line, and so on. Thus it will be understood that the balance counter magnets connected to the inverter wheels which stand at "8" will receive an impulse for adding a unit, all those connected with wheels that stand at "7" will receive an impulse for adding two units, and so on. It will be clear that the invention provides a simple wiring system as only nine leads are used in the entire inverting system for energizing the counter magnets. While this particular application of the invention has been selected for illustration so that the operation of the device may be explained in connection with a concrete example, it is obvious that other forms of entry retaining devices may be substituted for the inverter wheels and other forms of manifesting devices may be substituted for the balance counters.

Other objects, uses and advantages of the present invention will be hereinafter pointed out in the specification and claims and shown in the drawings, which show by way of illustration what is now considered to be a preferred embodiment of the invention.

Figure 7:
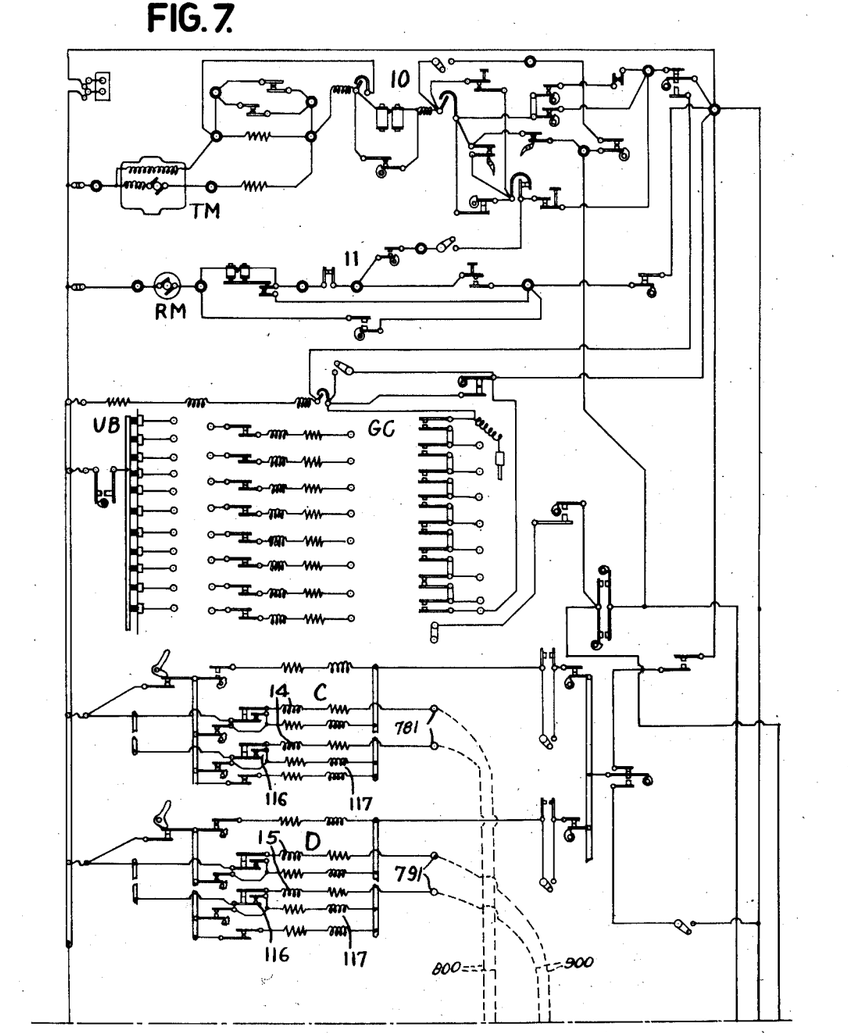
Figs. 7 and 7a used together constitute a wiring diagram of the machine.
Figure 7A:
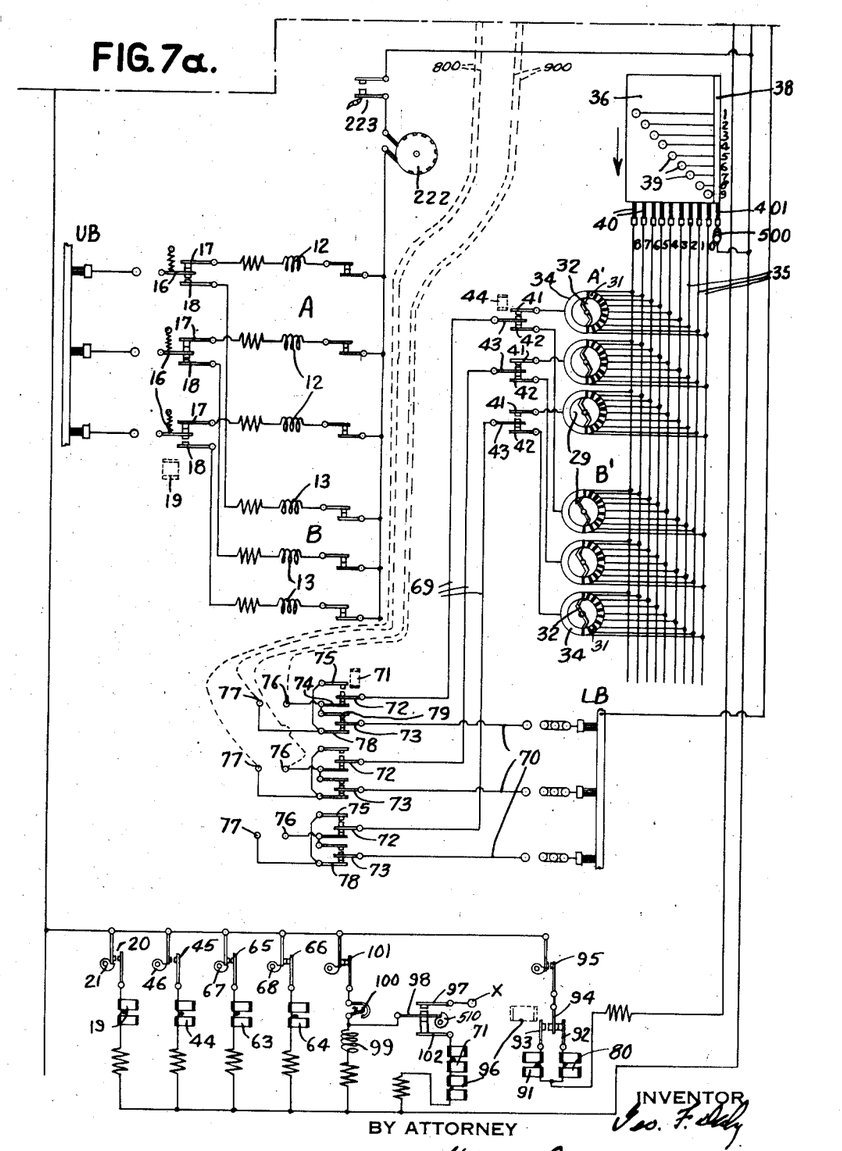

The wiring diagram in Fig. 7 is substantially the same as that shown in the patent to Daly and Page, previously referred to. During adding operations the machine is driven by a tabulating motor TM controlled by a group of cam and relay controlled circuits indicated at 10 and is driven during total taking operations by a reset motor RM controlled by a group of circuits, contacts and relays designated generally at 11. When the tabulating motor TM is in operation it feeds the usual perforated tabulating cards, bearing differentially arranged index points representing digits, first, beneath the upper analyzing brushes UB and exactly one machine cycle later beneath the lower analyzing brushes LB (Fig. 7a). By means of the group control mechanism indicated generally at GC, groups of cards, as represented by the same data entry in certain selected columns, may be operated upon separately, the items of each group being accumulated and the result of the accumulation secured before the machine begins operation on the following card group.

As the perforated cards pass the upper brushes their index points instantaneously close circuits through the proper upper analyzing brushes UB to energize the entry receiving magnets 12 or 13 (Fig. 7a) in inverters A and B. When the cards pass the lower brushes LB the proper selected balance counter magnets 14 or 15 (Fig. 7) are energized.

As usual, the timed energizations of these magnets control mechanism for entering the data corresponding to the card reading on the counter wheels. When any balance counter magnet 14 or 15 is energized it causes contacts 116 to close, energizing a printer magnet 117 to select the type corresponding to the entered data for printing. In this fashion the accumulated items may be listed. The accumulating and printing devices do not require a specific description per se aside from an explanation of the way they enter into the present invention and will not be described in detail as they are well understood and fully described and explained in the patent previously mentioned.

As the card is leaving the upper brushes a perforation provided for the purpose informs the machine whether the item on that card is a debit or credit, and the machine acts in accordance with that information to distribute the items in appropriate form to the proper accumulators.

For the above purpose four devices are required. For clarity of description these particular devices will be referred to as inverter A (Figs. 1 and 7a), inverter B, credit balance counter C (Fig. 7) and debit balance counter D. The first two devices are used for inverting the items presented. The third device is used for obtaining a credit balance if it shows a true positive total, and the fourth device for a debit balance if it shows a true negative total.

It will be noted that one inverter device is receiving an item from the upper brushes at the same time that the setting of the other inverter device is used in transmitting the complement of the next preceding item to a balance counter. The reason for the provision of two inverter devices is so that one counter may be receiving and setting up one item while the setting of the other device is used in transmitting a different item to a balance device. If inverter A is used for one card, inverter B is used for the next card, alternately, regardless of whether the card presents a debit or credit item.

As a credit card passes through the machine the item standing thereon is inserted at its face value in an inverter device during one card cycle; during the next card cycle the item is added at its face value in the credit balance counter and its complement is added in the debit balance counter. Conversely, if a debit card passes through the machine, the item standing thereon is entered at its face value in an inverted device during one card cycle and during the next card cycle the face value of the item on the card is added in the debit balance counter and its complement is added in the credit balance counter.

With reference to complements, it will be noted that the complement of a number is arrived at in this invention in the following manner: The complement of an item composed as they are in the present examples of eight or less digits is the difference between 100,000,000 and that number. A convenient method of obtaining this complement is to let each digit of the number (including zeros to the left of the highest significant figure) be subtracted from "nine" and then add "one" to the right hand figure of the resulting number. This is a convenient and infallible method of obtaining the complement of a number of several digits. In the example shown in Fig. 6 the first credit item 9430 is added in the credit balance counter as a true number and is added in the debit balance counter as a complement. This is done by adding 99,990,569 plus 1 to form a true complement as described above. The next item which is a credit figure of 671 is added in the counters in the same fashion. The first debit item 10234 is added as a true number in the debit balance counter and its complement is added as 99,989,765 plus 1 into the credit balance counter in the manner previously described. The other debit and credit amounts are treated in the same way as the examples above noted.

When the machine has finished its adding operations and is ready to total print there will always be one of the net balance counters showing a "nine" in the eighth column. It is assumed that the total of the added negative or positive amounts will not exceed seven figures. A "nine" in the eighth column (from right to left) always indicates that the total is a complement and if it is so desired, the printing of this number as a total may be suppressed by the use of devices described in the Bryce British Patent No. 273,731. If desired, the complement may be printed adjacent the number representing the net balance below the listed items on the record sheet.

The two right hand columns on the chart in

Figure 6:
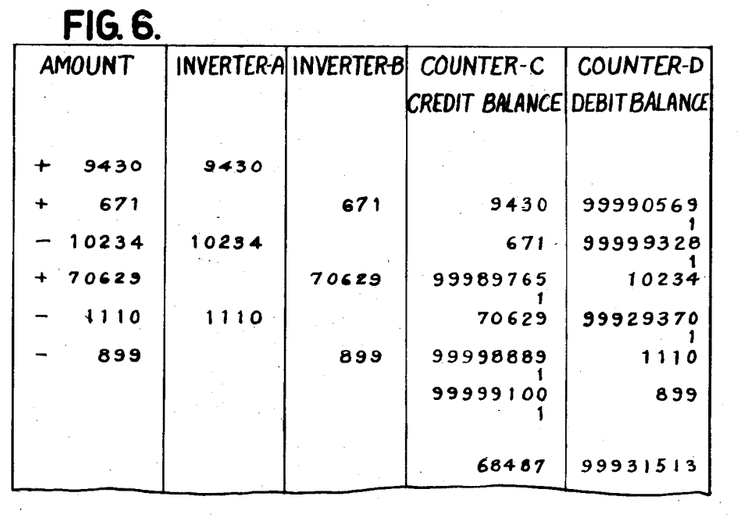
Fig. 6 is a chart showing the various entries and the method by which the machine arrives at the net balance of those entries.

Fig. 6 show how the example given would normally be printed on a record sheet showing the individual debit and credit items, the complements of these items, the net balance which happens to be a credit balance, and the true complement of the net balance.

Figure 5:
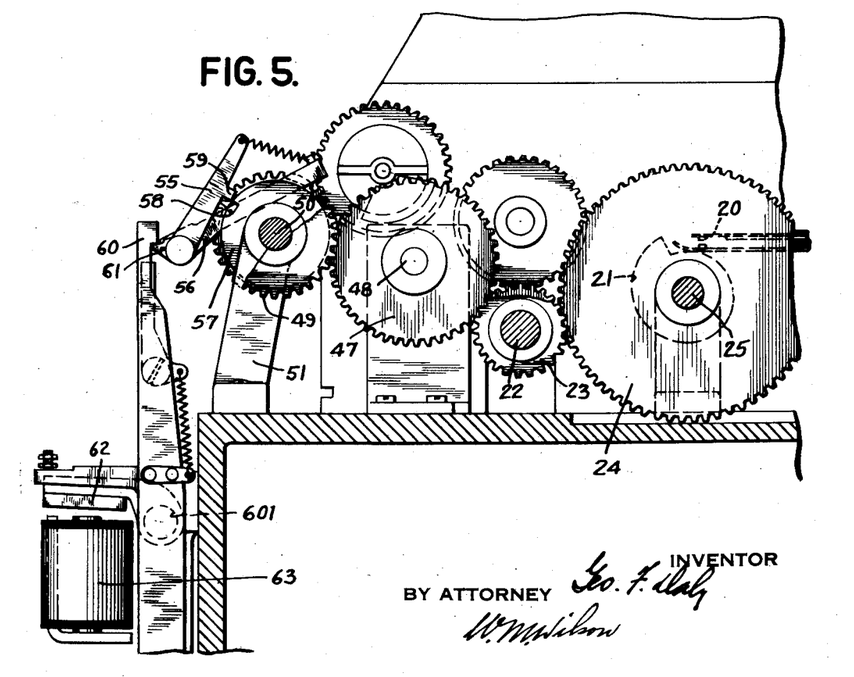
Fig. 5 is a section taken along the line 5—5 in Fig. 1, showing an end view of the resetting and cam operating gearing.

Turning now to the manner in which the amounts are entered into the entry receiving or inverter devices, it is noted in Fig. 7a that plug wire connections may be made from the upper brushes to a series of contacts 16. In the position shown the contacts 16 close circuits through upper contacts 17, thus directing the impulses from the upper brushes to energize magnets 12 in inverter A and thereby entering an amount in this device and positioning the associated commutator arms 32. A series of lower contacts 18 are connected to the magnets 13 in inverter B so that when the contacts 16 are lowered, closing the circuit between the upper brushes and magnets 13, an amount is entered in inverter B. The contacts 16 are lowered on alternate card cycles by means of a magnet 19. This magnet is energized alternately by means of a pair of contacts 20 that are opened and closed by a cam 21. The devices for rotating cam 21 are shown in Fig. 5. There it is noted that drive shaft 22 has a pinion 23 meshing with a gear 24 mounted on the shaft 25 to which cam 21 is attached. The ratio of the gearing is such that shaft 25 is turned one-half a revolution per card cycle, thus enabling cam 21 to close contacts 20 during one card cycle and allow the contacts to open during the next card cycle.

An impulse distributor 222 (Fig. 7a) is located between the inverters A and B, and the right side of the line. This distributor controls the current so that an impulse is allowed to run through the line only when a hole in the card is under a brush. Contacts 223 are closed when a card is under the upper brushes.

Figure 1:
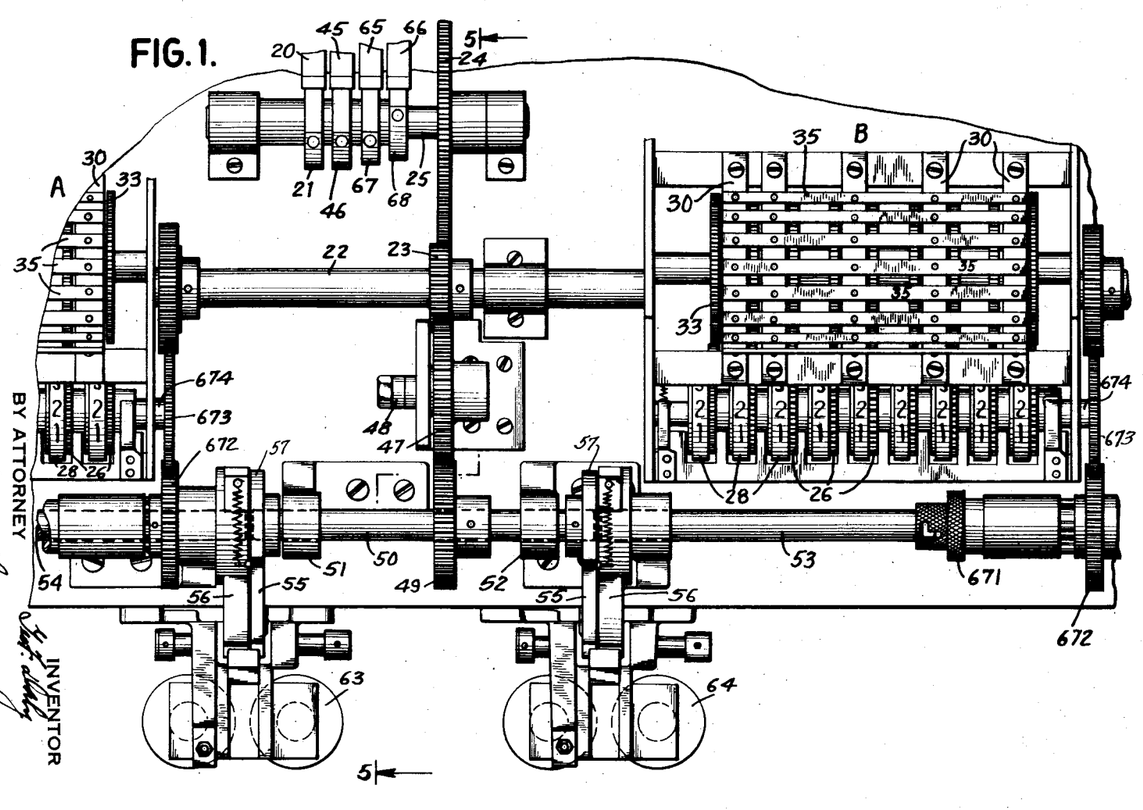
Fig. 1 is a plan view showing one complete inverter device and a portion of the other inverter device. The inverter resetting devices and the cams for energizing the reset magnets are also shown in this figure.
Figure 2:
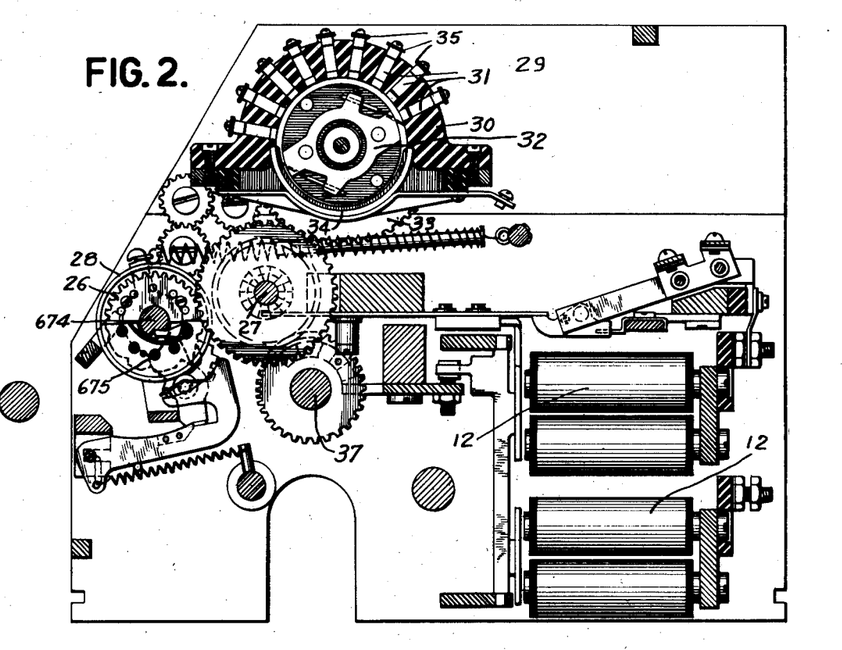
Fig. 2 is a vertical section through the inverter section of the tabulator showing the relationship of the commutators to the inverter storage wheels.

Referring now to Figs. 1 and 2, the inverter storage wheels are represented by gears 26 driven from a shaft 27 under control of the magnets 12 as previously stated. As usual, indicating wheels are provided at 28 fixed to the storage wheels so that the data entered on the storage wheels may be visually indicated.

The inverting mechanism indicated generally at 29 in the upper part of Fig. 2 consists of a commutator 30 provided with segments 31 corresponding in number and position to all the digit indicating positions of the storage wheel 28 except the nine position. Since the complement of nine is zero and the balance counter magnets do not have to be energized to add zero, it is obvious that it is not necessary to have a set of impulse carrying inverter segments for this position of the inverter wheels. A brush structure 32 is mounted on a gear 33 driven by the gear which drives the storage wheel 28 so that the brush structure is angularly displaced according to the reading on the wheel. The structure carries two brushes, one of which engages the segments 31 and the other of which engages a common segmental conductor 34 the inner surface of which corresponds in radius to the semicircular wiping surface of the commutator. Referring to Fig. 1, it will be noted that wherever possible one commutator 30 has been placed between two adjacent gears 33 to cooperate with two brush sets 32 to conserve space and simplify the structure. Each group of segments 31 corresponding to the same digit are connected to a common conducting bar 35 (Fig. 1) whereby all the "8" segments are in multiple, all the "7" segments in multiple, and so on.

Figure 3:
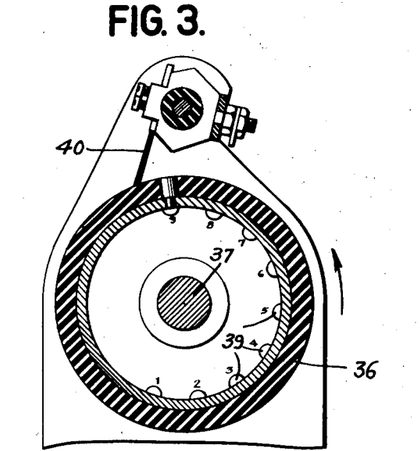
Fig. 3 is a sectional detail view of the emitting device for initiating the timed operating impulses.

The device for emitting the timed impulses synchronized with the movement of the counter wheel clutches in the balance counters is shown in Figs. 3 and 7a. This emitter consists of an insulating shell 36 suitably mounted on the shaft 37 so that it rotates in synchronism with the counter clutch drive shaft 27.

Referring to the development in Fig. 7a, this emitter is provided with a continuous contact ring 38 and a plurality of contact spots 39, each of the latter being electrically connected to the ring 38. The spots 39 are displaced from each other both laterally and circumferentially, the circumferential spacing being such that each spot reaches a reading line formed by brushes 40 in time to energize the magnets for the balance counter clutches so that the clutches will engage and turn the counter wheels a corresponding amount. The lateral offset of the spots 39 permits each to cooperate with a separate brush 40. These brushes are electrically connected with the bars 35 connecting the common commutator segments as shown in Fig. 7a. A brush 401 contacting ring 38 is connected to a wire leading to the right side of the line.

It is noted that in Fig. 7a each of the bars 35 are numbered, a number being placed to the right of each bar to identify it. The bar at the extreme right is numbered 0; the second bar from the right is numbered 1, and so on. The zero bar is connected with all the segments 31 which are so placed in the commutators that a brush 32 will contact with them when the connected storage wheel stands at zero. In the same way, each of the other bars 35 is connected with the related segments in the commutators 30. On this same figure it is also noted that each of the spots 39 may be identified by a number located in line with the spot at the right hand side of the emitter development. The arrow shown at the left of the emitter development shows the direction of movement of the emitter past the line of brushes 40. It is noted that the spot numbered 9 will be the first to pass under the line of brushes 40 and that this spot will contact with the brush 40 leading from the bar 35 numbered 0. The eight spot will be the second to approach the line of reading brushes and will make contact with the brush 40 extending from the bar 35 numbered 1. The other spots 39 contact the related brushes 40 in successive order. From the above it may be gathered that the zero segments on the commutators will be the first to receive impulses from the emitter and said impulses are directly through the brush structures 32 to energize connected counter clutch magnets 14 or 15 (Fig. 7) in time to turn the related balance counter wheels through nine steps of movement.

In the same way the segments connected to the common bar 35 numbered 1 will receive an impulse at a time enabling them to energize the connected counter magnets so that an eight may be inserted in the counter wheels. In the same way all the bars 35 receive an impulse which is so timed as to energize the balance counter wheel connected with the inverter devices of that bar so that a complement of the number represented by inverter wheel having brush connections to the bar may be turned in the balance counter wheel.

In Fig. 7a it is noted that the inverter commutator devices related to inverter A are shown at A' and the commutator devices for inverter B are located below at B'. Wires from the commutators at A' carry impulses from the commutators to a series of upper contacts 41. The impulses from the lower commutators at B' are carried by wires to a series of contacts 42. Mounted in a manner enabling them to contact with either upper contacts 41 or lower contacts 42 is a series of contacts 43. As shown in Fig. 7a they have closed the circuit to the lower group of inverter commutators which are associated with the inverter B. A magnet 44 is adapted to attract the contacts 43 so that they will close the circuit to the upper commutators which are associated with the inverter A. This magnet 44 is energized on alternate card cycles by means which opens and closes a pair of contacts 45 under control of a cam 46. This cam 46 is mounted on the same shaft 25 that cam 21 is fixed to, cam 46 also receiving a half revolution on each card cycle. The directing of the complemental impulses from A' or B' into the proper balance counter will be described further on in this specification.

As explained before, while the one inverter device is receiving a true number from the upper brushes, the other inverter device is acting as part of the mechanism for inverting a number which is directed into one of the balance counters and is simultaneously being reset. The description of the devices for resetting the inverter storage wheels will now be taken up.

By reference to Figs. 1 and 5 it will be noted that the pinion 23 mounted on shaft 22 is in mesh with an idler gear 47 mounted on a stud 48. This gear is in mesh with another gear 49 mounted on a resetting stub shaft 50. As shown in Fig. 1 shaft 50 is supported in bearings 51 and 52 and has its ends abutting the ends of resetting shafts 53 and 54 associated with the inverter devices A and B. The three shafts 50, 53 and 54 are in axial alinement. Shaft 50 rotates during item entering operations of the tabulator receiving one revolution per card cycle. The other two shafts 53 and 54 are alternately connected with shaft 50 in order to alternately reset the inverter devices A and B. The reset shafts 53 and 54 are alternately connected to the stub shaft 50 by means of clutch pawls 55 which are mounted on frames 56 there being a frame 56 on the end of each reset shaft. Close to the ends of shafts 53, 54 are two disks 57 (Fig. 5) fast to shaft 50 and located at both ends of this shaft. Each disk 57 is provided with a notch 58 into which a finger 59 on pawl 55 may be engaged in order to connect one or the other of the shafts 53 or 54 with the resetting drive shaft 50. Each pawl 55 is normally held out of engagement with a resetting driving disk by an arm 60 the end of which engages a tail 61 on the pawl, lifting it out of the path of the disk as the carrying frame 56 nears the home position. The pawls are alternately released by a counterclockwise movement of one or the other of the arms 60 about pivots 601. The release arms 60 are connected with armatures 62 that are displaced when one or the other of two magnets 63 and 64 are energized. From the plan view in Fig. 1 it may be noted that magnet 64 controls the connection of the resetting drive shaft to reset inverter device B while magnet 63 controls the resetting of inverter A. The alternate energization of these magnets is brought about by means of contacts 65 and 66 (see lower portion of Fig. 7a). The contacts 65 and 66 are alternately opened and closed by means of cams 67 and 68. The cams 67 and 68 are mounted on the same shaft 25 that the cams 21 and 46 are mounted on. The cams 67 and 68 serve to open and close contacts 65 and 66 on alternate card cycles.

While cam 68 is holding contacts 66 closed so that magnet 64 is energized and the wheels of inverter B reset, cam 67 allows contacts 65 to open thus preventing a resetting operation on inverter A.

Each of the shafts 53 and 54 is provided with a clutch 671 (Fig. 1) which serves to normally connect the shaft with a gear 672. This gear drives another gear 673 which is fixed on the end of a notched reset pickup shaft 674 (Fig. 2) in each of the inverter devices. The shaft 674 in turning cooperates with pawls 675, there being a pawl on each inverter wheel. The shaft in turning to reset rotates in the same direction that the wheels rotate in adding, so that the wheels that have remained in a position to indicate "0" are the first wheels to be picked up by the shaft as it turns. Wheels that stand at "1", having been moved one step in adding, are the ones that are the next to be picked up, and so on. As the wheels standing at zero have positioned brush structures 32 through which the first inverted or "9" impulse is directed, the resetting devices are timed to pick up such wheels first and the other wheels in order, allowing each wheel to remain undisturbed while an impulse is directed through the associated brush structure. Thus, it is possible to transmit inverted impulses through the inverter wheels and reset them at the same time, the orders through which the last inverted impulse is directed being the last to be reset. The shaft 674 in turning lags behind enough to insure the passage of an impulse through the commutators of the wheels before the pawls on the wheels are picked up by the shaft during resetting.

The manner in which cams 21, 46, 67 and 68 are mounted on shaft 25 may be noted in Fig. 1. There it may be seen that the cams are mounted in a compact formation on the shaft 25 driven by the large gear 24. The ends of contacts 20, 45, 65 and 66 are in parallel alignment above the cams.

The distribution of the complement and true number to the balance counters will now be discussed. Amounts are entered into the balance counters C or D (Fig. 7) by means of the energization of counter magnets 14 or 15 with timed impulses through wires 69 (Fig. 7a) leading from the inverter devices or through wires 70 leading from the lower brushes LB which are analyzing the card.

These impulses are selectively distributed so that one counter will receive the complemental number from the inverter devices while the other balance counter will receive the true amount directly from the card while it is under the lower brushes. This selective control is brought about by means of energizing a magnet 71 (Fig. 7a) which is adapted to attract a series of contacts 72 extending from the ends of the wires 69 reaching to the inverter mechanism and also a series of contacts 73 at the end of the wires 70 leading to the lower brushes. The contact 72 normally closes a circuit through a contact 74 when a credit item is being entered into the counters. However, if a debit item is presented, magnet 71 is energized under control of a special perforation in a debit card as explained hereinafter, and contact 72 is urged upward (Fig. 7a) to close a circuit through a contact 75. Normally the complementary amount will be sent by means of impulses in the wire that terminates at plug socket 76. However, when a debit item is presented, the impulses will be switched into a line reaching out to sockets 77. At the same time that the impulses for the complementary amount are being switched from one line to the other the impulses from the lower brushes are also being switched by means of the magnet 71. Normally the current from the lower brushes will flow from the contacts 73 through contact 78 to the plug socket 77. This is at a time when the complementary amount may be taken by plugging in at 76. If the conditions are reversed by the presentation of a debit amount, the contacts 73 will be urged upward by the magnet 71 to close the circuits through contacts 79 leading to the plug sockets 76. From the above it may be gathered that the true amounts and the complementary amounts of items presented to the machine may be selectively entered into credit balance counter C or debit balance counter D according to whether the item is a debit or a credit. If it is a credit item, the true amount is added in counter C and the complement is added in counter D. If the item is a debit, the true number will be added in counter D and the complement added in counter C.

The wiring between the plug sockets 76 and 77, and the counters C and D insures the correct distribution of the complement and the true number. From the plug sockets 77 (Fig. 7a) plug wires 800 extend to plug sockets 781 (Fig. 7) in credit balance counter C. The other sockets 76 have connections 900 to the plug sockets 791 in counter D. From the position of the parts in Fig. 7a it is obvious that the item being handled is a credit; the impulses for the inverted or complemental number going through wires 69 to sockets 76 and into the debit balance counter D, while the impulses for the true number are coming from the lower brushes to sockets 77 across to sockets 781 and into the credit balance counter C. Upon energization of magnet 71 the contacts 72 and 73 will be lifted and the true number of the debit item will go into counter D while the complement of the number is added on counter C.

Figure 4:
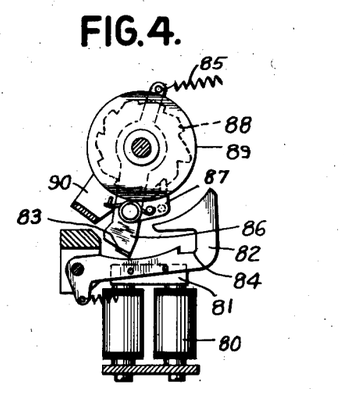
Fig. 4 is a detail view of the "elusive one" magnet and supplementary devices in each totalizer or counter.

It was noted hereinbefore that it is necessary to add "1" to the right hand column of the balance counter into which a complement is being added in order to fill out the complement. For this purpose the units order wheel in each balance counter is provided with a device such as that shown in Fig. 4. A magnet 80 when energized will attract its armature 81 to which is fixed latch lever 82, causing the latter to move downward to release extension 83 from notch 84, allowing spring 85 to bring carry lever 86 into the position shown in Fig. 4, so that pawl 87 may drop into another tooth on ratchet 88, which is fixedly mounted to the adding wheel 89. Then when lever 86 is restored to its normal latched position by bail 90 it will move adding wheel 89 to the next higher position, thus adding "1". The above transfer mechanism may be found in Hollerith Patent No. 974,272, issued November 1, 1910. In Fig. 7a is may be noted that a magnet 91 is arranged parallel to magnet 80 in the circuit. The insertion of the elusive one to complete the complement of a credit item added in the debit counter D is taken care of by magnet 80, while magnet 91 serves to add a unit to complete the complement entered in credit counter C when a debit item is entered in the machine.

A contact 92 is connected to magnet 80, and a wire from magnet 91 terminates in a contact 93. A switching contact 94 is common to contacts 92 and 93 and is adapted to close the circuit through either magnet 80 or 91 according to whether a credit or debit item is being handled by the machine. When a credit item is being added in the machine contact 94 engages contact 92 and at the proper time, which is determined by the closing of contacts 95, magnet 80 is energized and a unit added on the units wheel in the debit balance counter. If a card with a debit item is run through the machine, contact 94 will be urged by a magnet 96 to break the connection with contact 92 and to make a connection with contact 93, thus diverting the current through magnet 91 which, it will be remembered, is in the units bank of the credit balance counter.

The devices for controlling the selective energization of magnets 71 and 96 in order to properly distribute the complement and the true number will now be described.

The energization of magnets 71 and 96 is controlled by the designating perforation representing a debit card. As a debit card passes the upper brushes its item will first be entered into an inverter entry receiving device to set up the shiftable brushes of the device to prepare for reading out the complement during the following cycle. After this the debit perforation passes a selected one of the upper brushes which has a plug wire connection to socket X (Fig. 7a) completing a circuit through contacts 97 and 98 which are closed instantaneously by cam 510 as the distinguishing perforation reaches the brush, and through relay 99 in parallel with the magnets 71 and 96 the energization of which shifts the switches 72, 73 and 94 to their alternative position.

The circuit through magnets 71 and 96 is made by contact 98 and contact 102 when contact 98 is not in momentary engagement with contact 97. When relay 99 is once energized a stick circuit is prepared for it through its relay contacts 100 and cam contacts 101 which close just before the debit denoting perforation reaches the controlling brush and remain closed until the zero index point of the following card has passed the brushes. The switch contacts 72, 73 and 94 then remain shifted during the entire reading cycle in which a debit card is under the lower brushes.

A debit card then as it passes the upper brushes will first position an inverter device so that the complement may be read out in the following cycle, then shift the switches 72, 73 and 94 to select the proper balance counter and during the following cycle the true value of the item will be entered from the lower brushes into counter D and the complement plus one will be entered into counter C.

If, however, the card passing the upper brushes has no hole punched in the control position, it is a credit card, the relay 99 remains deenergized, magnets 71 and 96 remain deenergized, throughout the next succeeding card cycle, and contacts 72, 73 and 94 will remain in the position shown in Fig. 7a. In this case the true value of the credit item will be enerted into counter C from the lower brushes and the complement will be entered into counter D plus a unit entered by energization of magnet 80.

Since the wiring diagram in Figs. 7 and 7a has often been referred to in the above description it is thought unnecessary to give a review of operation with reference to the diagram at this point in the specification.

During total printing from the balance counters a switch 500 (Fig. 7a) may be opened by the operator of the machine to break the circuit through the emitter.

If desired a single balance counter may be used in the present machine, the complements being read from one class of cards, debit or credit, and only the true numbers being read from the other class of cards. The balance counter which is not used is not connected to the rest of the machine by plug wires.

While the invention has been described in connection with mechanism for inverting to the nines complement of numerals it is obvious that the inverting devices could be arranged to take care of other complements of numerals. Furthermore, many modifications in the mechanical and electrical details will readily occur to those skilled in the art and it is to be understood that the embodiment illustrated is not to be construed in a limiting sense as I intend to be limited only as indicated by the scope of the following claims.

1. In a device of the class described, a plurality of storage wheels, a commutator related to each wheel, a brush cooperating with each commutator and adjusted by a related storage wheel, an emitting device for sending out timed impulses, connections between said emitting device and said commutators, an accumulating wheel, a clutch for engaging and actuating said wheel, the arrangement being such that the clutch will engage the accumulating wheel under control of an impulse at a time enabling it to turn the accumulating wheel the complement of the number standing on the storage wheel.

2. In a machine of the class described, a pair of sets of storage wheels, card sensing devices, means for alternately operating the sets of wheels under control of said card sensing devices, commutator devices adjusted by said wheels and an impulse emitting device cooperating with said commutators, a pair of accumulators, means for selectively connecting one or the other of said accumulators with one of the sets of storage wheels, another card sensing device, means for connecting the unselected accumulator with the last mentioned card sensing device, and means whereby the emitting device will invert the reading of the connected set of storage wheels and transfer the same to the selected accumulator while the unselected accumulator is receiving an amount under control of the last mentioned card sensing devices.

3. In a device of the class described, a storage wheel, a commutator settable by said wheel, an emitter for sending an impulse through said commutator at a time designed to give an inverted reading of the standing of the wheel, an accumulating device adjusted under control of said impulse, and means for resetting said wheel simultaneously with the operation of the emitter.

4. In a machine of the class described, perforated card sensing devices, a pair of sets of storage wheels, means for operating the sets of storage wheels alternately under control of the reading of said sensing devices, means for resetting said sets of wheels alternately, means for taking a complementary reading of the sets of wheels alternately, a pair of balance accumulators, means for selectively adding the amount read from the sensing devices on one accumulator and the complementary amount read from one of said sets of wheels to the other accumulator, means for adding the "elusive one" in the accumulator receiving the complemental amount, and means for controlling the printing of the amounts entered into the accumulators and the total net balance standing on one of said accumulators.

5. In a machine of the class described, a plurality of storage wheels, means for differentially moving said wheels, a commutating device having contact strips that are common to all the wheels, brush devices one for each wheel and adjusted by the wheel to contact with one or the other of said contact strips, an impulse emitter for sending timed impulses through the contact strips, the first impulse being sent through the strip which is contacted by brushes on wheels in the "0" position, the second impulse being sent through the strip which is contacted by brushes on wheels in the "1" position, etc., to the ninth impulse which is directed through the strip contacted by the brushes on wheels in the "8" position, a plurality of accumulator wheels, means for adjusting the wheels of the accumulators by timed impulses, the initial impulse controlling the adjustment of the accumulator wheels through nine steps of movement, the second impulse controlling the adjustment of the wheels through eight steps of movement, etc., the ninth impulse controlling the adjustment of the wheels through one step of movement, and means for transmitting the impulses under control of the storage wheels to the means for adjusting the accumulator wheels.

6. In a machine of the class described, an entry receiving device having a plurality of denominational order elements each movable to different positions to represent the several digits, an accumulating mechanism, an emitter common to all the elements of the device for emitting a group of impulses consisting of a single impulse representative of each digit, and means associated with each denominational order element for selecting from the group only that impulse representing the complement of the digit corresponding to its position for controlling the accumulating mechanism.

7. In a machine of the class described, an entry receiving device having a plurality of similar elements each adapted to represent by different conditions different data of a group which group is the same for all the elements, a registering mechanism, means for controlling the registering mechanism comprising a group of circuits common to said elements and equal in number to the different data which an element may represent, and means associated with each element for connecting the circuit complementary to its data representing condition to the registering mechanism.

8. In a machine of the class described, an entry receiving device having a plurality of denominational order storage elements individually movable to different positions to represent digits, an accumulating mechanism having a plurality of denominational order elements each coordinated to a storage element and electrically controlled operating mechanism for each accumulating element to control the accumulation of the different digits, a group of control circuits for the accumulating mechanism equal in number to the digits which may be represented by a single denominational order storage element, and means individually controlled by each storage element for selectively connecting the operating mechanism of its coordinated accumulating element to the control circuit adapted to give a complementary reading of the storage element.

9. In a machine of the class described, an entry receiving device comprising a plurality of similar data representing elements, an accumulating device comprising an impulse controlled member movable to different positions to effect adding of different data standing on said entry receiving device, an emitter common to the several data representing elements for emitting differentially timed impulses corresponding to the several data which may be represented by a single element, means for driving the emitter and member in synchronism to time the impulses with corresponding positions of the member, and means associated with the receiving device for selecting and making effective for control of the member only the impulses corresponding to the complement of the data readings on the several elements of the entry receiving device.

10. A subtracting mechanism for an accumulating device including mechanism responsive to timed electrical impulses for representing digits, comprising an entry receiving device provided with a plurality of denominational order elements, a group of control conducting bars common to all orders and equal in number to the digits to be represented and each corresponding to a digit, means for initiating impulses in the several bars timed to adapt each to control said accumulating device to add a different digit, a commutator associated with each denominational order element having a segment connected to each control bar and a brush associated with each denominational order element and settable by the same according to its reading to engage the proper segment to connect the accumulating device to the control bar corresponding to the complement of the digit represented by the element.

11. An accounting machine including data entering means and data retaining means in combination with inverting mechanism comprising a plurality of sets of storage wheels for receiving successive data entries from said data entering means and reading-out means controlled by said wheels for inverting the successively received data and entering them into the data retaining means, said wheels and reading-out means having a portion of their operating cycles in common so that data receiving by the wheels occurs concurrently with the reading-out operations.

12. An accounting machine including data entering means and data retaining means in combination with inverting mechanism comprising a pair of sets of storage wheels for alternately receiving data entries from said data entering means and a pair of reading-out devices alternately controlled by said sets of storage wheels to alternately invert the received data and enter it into the data retaining means.

13. A cyclically operable record controlled accounting machine including analyzing means for searching controlling records for data designations in successive machine cycles, data retaining devices and differentially adjustable storage wheels controlled by the analyzing means in accordance with record analysis during one machine cycle to enter the data in inverted form into certain of said data retaining devices during the following machine cycle, certain others of said data retaining devices being controlled directly from the analyzing means during the last named cycle to enter data therein in its uninverted form.

14. An accounting machine including data entering means and data retaining means in combination with an inverting means comprising differentially adjustable wheels provided with commutators and coacting brushes, means under control of said data entering means for adjusting said wheels, and reading-out means cooperating with the commutators to invert the data standing on said wheels and enter it into the data retaining means.

15. In a record controlled accounting apparatus, in combination, means for analyzing promiscuously arranged records bearing positive and negative amounts, a plurality of accumulators, devices for inverting and distributing the amounts, said devices normally showing the amount to be subsequently entered in the accumulators, and means so controlled by said devices that the one accumulator shows the net balance if the balance is positive or the complement of the net balance if the balance is negative, and the other accumulator shows the net balance if the balance is negative or the complement of the net balance if the balance is positive.

16. In a record controlled accounting machine for handling two classes of amounts derived from the records, in combination, an accumulator, a series of storage wheels, inverting devices cooperating with said wheels, a first analyzer device for transmitting true numbers from the records to said storage wheels and inverting devices by which the true numbers are inverted into the complements thereof, a second analyzing device and means operable for adding in said accumulator the true amounts derived by said second analyzing device from the first of said classes of amounts plus the complements of the true amounts derived by said storage wheels and inverting devices from the second of said classes of amounts, a second accumulator and automatic devices under control of the record whereby in said second accumulator are added the true amounts derived by said second analyzing device from the second of said classes of amounts plus the complements of the true amounts derived by said storage wheels and inverting devices from the first of said classes of amounts.

17. In a machine of the class described, two sets of differentially adjustable wheels, means for automatically adding an amount in said sets of wheels alternately, an accumulating device, and means for transferring to said accumulating device a complemental amount resulting from taking an inverted reading of one set of wheels while the other set is adjusted in adding.

18. In a machine of the class described, perforated record sensing devices, a plurality of sets of storage wheels, means for automatically operating said sets of wheels alternately under control of said record sensing devices, commutator devices adapted to be adjusted by said wheels, an accumulator, an emitter for sending timed impulses through said commutator devices, and means for controlling the operation of said accumulator by means of said timed impulses.

19. In a machine of the class described, perforated record sensing devices, differentially adjustable wheels one for each denominational order, means under control of said sensing devices for operating said wheels to add an amount, means for taking a complementary reading of the amount on said wheels, means for resetting said wheels during the reading operation, a pair of accumulating devices, means for selecting one or the other of said accumulating devices for operation, and means under control of said reading means for adding the complemental amount on the selected accumulating device.

20. In a machine of the class described, two sets of storage adding wheels, means for alternately adding an amount on one or the other of said sets of wheels, means for alternately resetting the sets of wheels, means for alternately taking an inverted reading of the amount registered on one or the other of said sets of wheels, a pair of accumulating devices, means for connecting one or the other of said accumulating devices with one of the sets of wheels, and means under control of the connected set of wheels for transferring to the accumulating device an inverted reading of the amount on the wheels.

GEORGE F. DALY.